United States Patent [19]

Bayerlein et al.

[11] Patent Number: 4,938,869
[45] Date of Patent: Jul. 3, 1990

[54] SPIRAL WOUND FILTER ELEMENT

[75] Inventors: Richard E. Bayerlein; Douglas G. Bayerlein, both of Elm Grove, Wis.; William G. Nostrand, Merced, Calif.

[73] Assignee: Bay-San Co., Inc., Milwaukee, Wis.

[21] Appl. No.: 377,776

[22] Filed: Jul. 10, 1989

Related U.S. Application Data

[63] Continuation of Ser. No. 262,113, Oct. 19, 1988, abandoned, which is a continuation of Ser. No. 4,657, Nov. 20, 1987, abandoned.

[51] Int. Cl.[5] ............................................. B01D 27/06
[52] U.S. Cl. ...................... 210/437; 210/457; 210/493.4; 210/494.1; 210/497.1; 55/498; 55/520; 55/521; 55/DIG. 44
[58] Field of Search ............... 210/437, 440, 443, 457, 210/493.2, 493.4, 494.1, 497.1; 55/484, 486, 487, 498, 520, 521, DIG. 44, DIG. 45

[56] References Cited

U.S. PATENT DOCUMENTS

| | | | |
|---|---|---|---|
| 1,742,743 | 1/1930 | Worbois | 210/167 |
| 1,805,903 | 5/1931 | Bull | 210/164 |
| 1,861,576 | 6/1932 | Liddell | 210/169 |
| 1,951,484 | 3/1934 | Lawes | 210/164 |
| 2,427,733 | 9/1947 | McCarr | 210/494.1 |
| 2,478,109 | 8/1949 | Kamrath | 210/165 |
| 2,647,637 | 8/1953 | Leet | 210/494.1 |
| 3,063,888 | 11/1962 | Howard et al. | 156/187 |
| 3,095,370 | 6/1963 | Krogman | 210/494.1 |
| 3,356,227 | 12/1967 | Rule et al. | 210/494.1 |
| 3,468,425 | 9/1969 | Engstrom | 210/490 |
| 3,827,562 | 8/1974 | Esmond | 210/494.1 |
| 4,032,688 | 6/1977 | Pall | 210/494.1 |
| 4,083,780 | 4/1978 | Call | 210/23 |
| 4,187,136 | 2/1980 | Nostrand | 156/192 |
| 4,233,042 | 11/1980 | Tao | 55/DIG. 25 |
| 4,241,787 | 12/1980 | Price | 166/105 |
| 4,296,810 | 10/1981 | Price | 166/265 |
| 4,411,791 | 10/1983 | Ward | 210/437 |
| 4,425,239 | 1/1984 | Jacocks et al. | 210/787 |
| 4,604,205 | 8/1986 | Ayers | 210/497.2 |

FOREIGN PATENT DOCUMENTS 2047107 3/1971 United Kingdom .

Primary Examiner—Richard V. Fisher
Assistant Examiner—Wanda L. Millard
Attorney, Agent, or Firm—Quarles & Brady

[57] ABSTRACT

A filter element is formed by spirally winding at least two layers of filter material about a central, perforate supporting core. The layers include a relatively fine porous filter material and a relatively coarse porous filter material. The layers may be formed from blankets of material, or one or both layers may be pleated. The fine filter material extends beyond the edge of the coarse filter material to overlie and close the longitudinal ends of the layers of the coarse material. Fluid to be filtered passes radially through the element until it encounters a clogged or plugged area. The fluid will then take a circumferential spiral route until it again finds an open area of the filter and can pass radially toward the core.

15 Claims, 3 Drawing Sheets

SPIRAL WOUND FILTER ELEMENT

This application is a continuation of application Ser. No. 262,113, filed Oct. 19, 1988, now abandoned, which is a continuation of application Ser. No. 004,657, filed Nov. 20, 1987, now abandoned.

BACKGROUND OF THE INVENTION

This invention relates to fluid filter elements, and particularly to filter elements used for filtering particulate contaminants from lubricating oil, fuel, gas, air and other fluids.

Filters for the lubricating oils of internal combustion engines typically use a disposable circular cylindrical filter element which has a perforate central core about which filtering media is assembled. The filter element is mounted within a casing having an inlet for the lubricating oils. The oil is introduced into the casing under pressure and passes radially through the filter media to the central core where the filtered oil is drawn off from one end of the core. Filters for fuel, gas, air and other fluids may be similar.

It is known in such filters to provide concentric layers of different filtering media. Typically, an outer layer is formed of a relatively coarse filter material such as a wood excelsior and an inner layer is formed of a relatively fine filtering media such as a cotton fiber batt. The coarser outer layer functions to remove the large particulate contaminants and the finer material of the inner layer then filters out the smaller contaminants as the fluid travels toward the central hollow core. Examples of such filter elements are found in U.S. Pat. Nos. 3,384,241 and 4,187,136 to Wm. Nostrand.

Such filter elements will occasionally plug prematurely by reason of a build up of particulate matter towards the outer surfaces of either the coarse or fine layer. The result is that much of the filtering capacity represented by the full thickness of the filter media is not utilized before it is necessary to dispose of the filter element and replace it with a new element. A filter element in accordance with this invention prevents premature plugging by directing the oil or other fluid through the filter along flow paths that expose all portions of the filter media, both coarse and fine, to the fluid. Plugging of one area of the filter simply causes the fluid to flow to another area where fresh filter material is available until the entire filter media becomes filled with particulate matter.

SUMMARY OF THE INVENTION

In accordance with the invention, a fluid filter element includes a hollow perforate cylindrical supporting core, a relatively fine filtering media spirally wound about the supporting core with adjacent layers spaced from each other, relatively coarser filtering media disposed in the space between the successive layers of fine filtering media, and means closing the longitudinal ends of the coarse filtering material.

In accordance with one preferred embodiment, the fine filtering media and coarse filtering media are provided by two blankets of porous filter material laid together and spirally wound about the supporting core. The fluid to be filtered will initially pass radially through layers of both blankets towards the core until a layer of one of the filter materials becomes clogged. Fluid will then pass circumferentially through the adjacent layer of the other filter material until the fluid encounters an unclogged layer of filter material, whereupon the fluid will resume a radial direction of flow.

In accordance with other preferred embodiments, the fine filtering media may be in the form of a pleated filter sheet, while the coarser filtering media may be either a blanket of porous filter material or a pleated filter sheet that nests with the pleated fine filter sheet. In both cases, the two filter strati are laid together and then spirally wound about the supporting core. More than two strati of filter media may also be used. For example, strati of fine, intermediate and coarse filter material may be spirally wound together about the supporting core.

In all of the preferred embodiments, a layer of the relatively coarser material is in contact with the supporting core and the relatively fine filter material extends beyond the ends of the supporting core to overlie and close the longitudinal ends of the layers of relatively coarser filter material. The relatively coarse filter material may be wood excelsior and the relatively fine filter material may be a batt of cotton waste.

It is a principal object of the invention to provide an improved fluid filter element which makes more efficient use of the full volume of filter material.

It is another object of the invention to provide a fluid filter element which has a longer useful operating life than those previously in use.

The foregoing and other objects and advantages of the invention will appear in the following detailed description. In the description reference is made to the accompanying drawings which illustrate preferred embodiments.

DETAILED DESCRIPTION OF THE PREFERRED EMBODIMENTS

Figure 1:
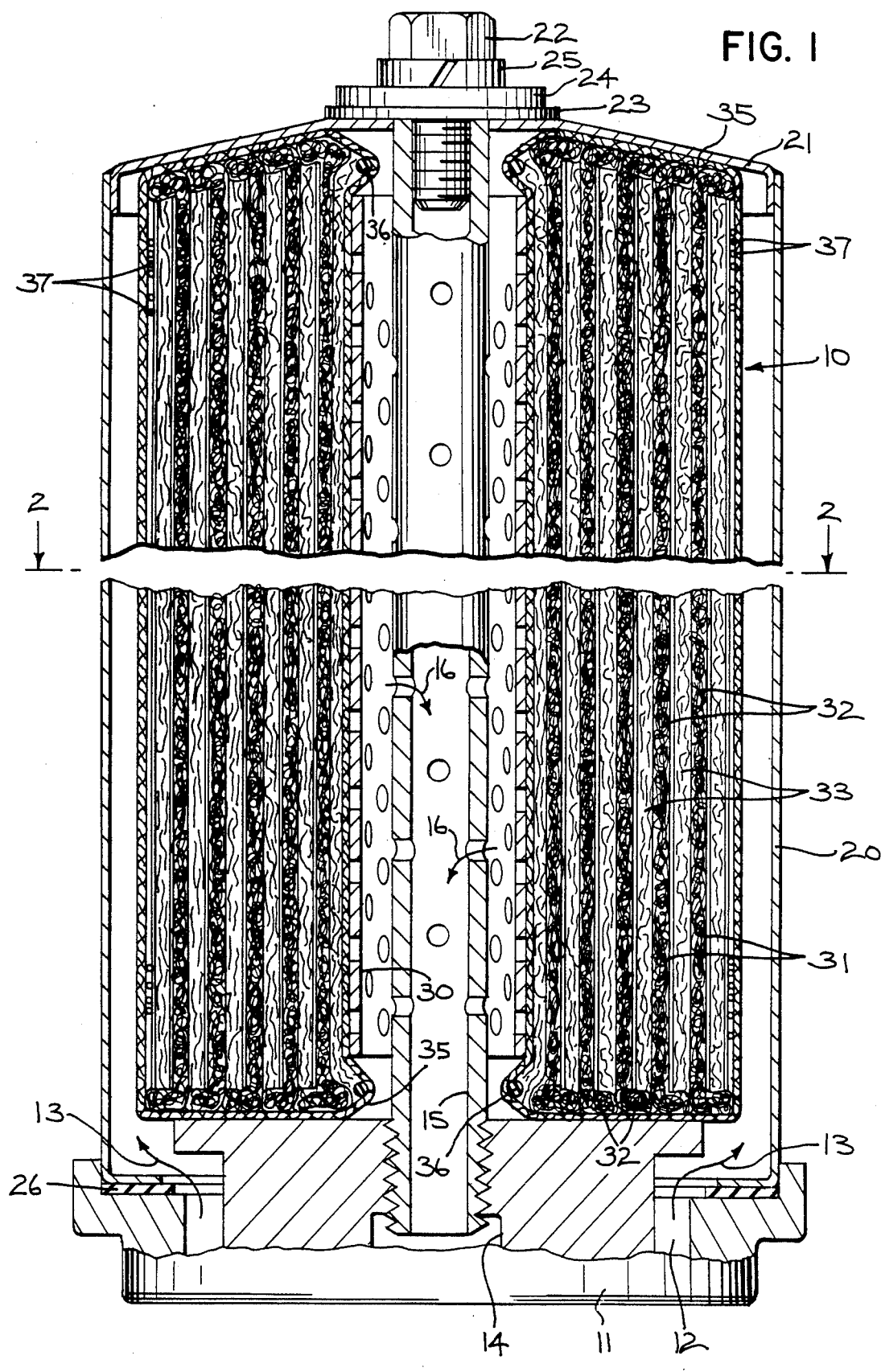
FIG. 1 is a view in longitudinal section of a filter element in accordance with the invention shown mounted in a casing.

Referring to FIG. 1, a filter assembly is shown that is useful for the filtering of engine lubricating oils. It should be understood, however, that other fluids may be filtered by a filter element in accordance with the invention. The assembly includes a filter element 10 mounted within a casing which includes a mounting assembly 11 with an annular inlet opening 12 through which fluid enters and surrounds the filter element 10, as indicated by the arrows 13. The center of the mounting assembly 11 has a concentric outlet opening 14 through which filtered fluid can exit from the assembly. Extending from the center of the mounting assembly 11 is a hollow, perforated central support tube 15 which is threaded at one end in the mounting assembly 11, concentric with the outlet 14. Filtered fluid entering the support tube 15 will flow towards the outlet 14, as indicated by the arrows 16.

A thin walled, cylindrical housing 20 has a domed end piece 21 brazed or welded to the housing 20 it to form a unitary casing. The end piece 21 could be formed integral with the housing 20 by deep drawing. The support tube 15 fits within a complementary opening in the center of the end piece 21. A bolt 22 is threaded into the end of the support tube 15 to hold a gasket 23 and washers 24 and 25 tightly upon the end piece 21 and to force the body of the housing 20 to be seated tightly atop a gasket 26 in the mounting assembly 11.

The filter element 10 is seated inside the casing concentric with the support tube 15 and the housing 20. One end of the element 10 is seated against and closed by the domed end piece 21 and the opposite end of the element 10 is seated against and closed by the face of the mounting assembly 11. As shown in FIG. 1, an annular space remains about the element 10 inside the casing so that fluid flowing through the inlet 12 may freely circulate about the outer circumference of the filter element 10 while the ends of the filter element 10 are essentially closed to fluid flow. The filter element 10 may be used with many different forms of casings or housings, and the structure shown in FIG. 1 is only illustrative of one approach. The only requirements for a casing for the filter element are that it contain an inlet and an outlet, that it allow circulation of the fluid to be filtered about the filter element while closing the ends of the element, and that its outlet communicate with the hollow center of the filter element 10.

The filter element 10 has a hollow, perforate, metal inner core 30 that surrounds but is spaced from the support tube 15. Filter media is spirally wound about the core 30 in a series of convolute layers which are more clearly shown in FIG. 2. Each layer is formed of an outer, thin, porous carrier sheet 31 of a non-woven synthetic material such as rayon or polyester fibers, a relatively fine filtering material 32 such as a batt of cotton waste, and a relatively coarse filter media 33 such as wood excelsior. All of the spirally wound layers are enveloped within an open-weave elastic sock 35.

Figure 2:
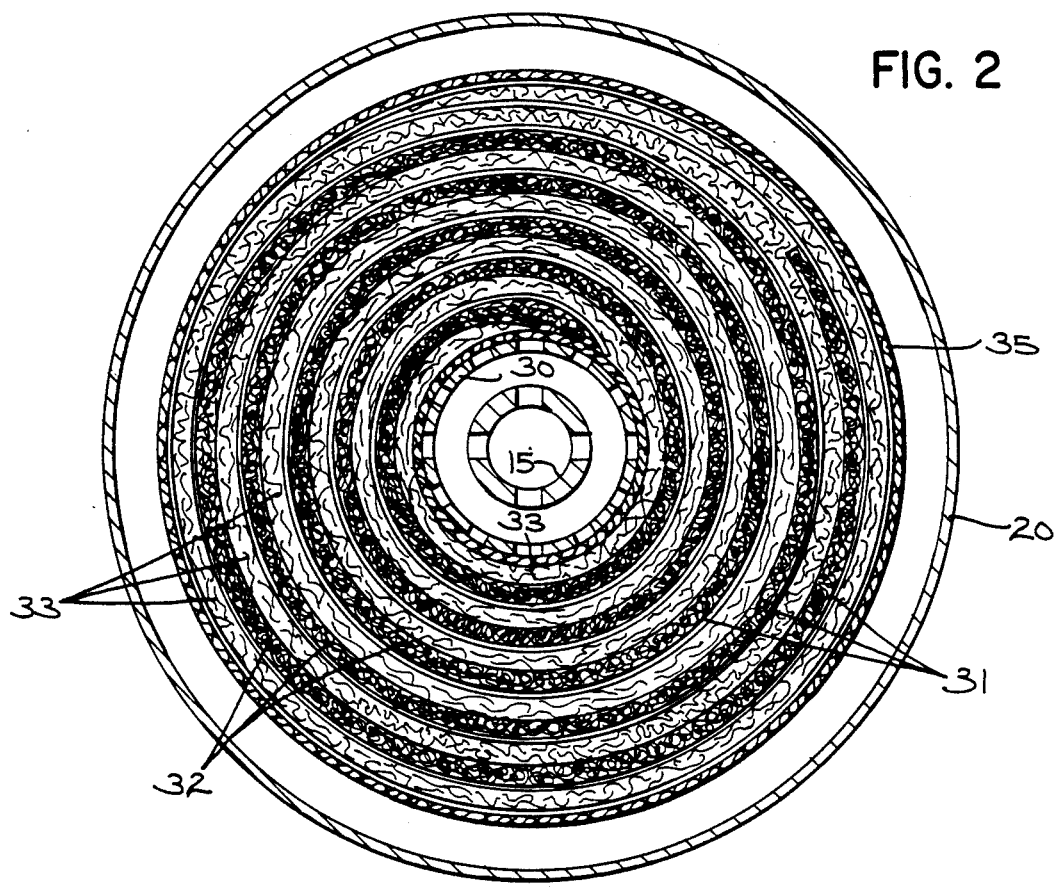
FIG. 2 is a view in transverse section of the filter element of FIG. 1.

In constructing the element 10, the sock 35 is first placed about the core 30 and held in place by a pair of O-rings 36 on opposite ends of the core 30 The carrier sheet 31, a blanket of the fine filter material 32 and a blanket of the coarse filter material 33 are laid one upon the other and the assembly is then wound about the sock-covered core 30 with the coarse material 33 nearest to the surface of the core 30. As shown in FIG. 2, the length of the blanket of the coarse material 33 is greater than that of the fine material 32 so that the outermost layer of filtering material is also comprised of the coarse material. The spirally wound layers are held in place by string 37 wound about and tied in place. The sock 35 is then doubled back upon itself at both ends to overlie the outer perimeter of the completed filter element 10.

It is important to provide a layer of the fine filter material 32 at each longitudinal end of the element 10 to reduce any tendency for fluid to flow axially of the element 10 between successive layers. As shown in FIG. 1, this can be provided by having the edges of the fine filter material 32 extend beyond the lateral edges of the coarse material 33 so that, when folded over by the sock, the end-most layers are of the fine material. This will result from using a blanket of the fine material which is slightly wider than that of the coarse material. Alternatively, a separate piece of fine material could be provided at each end of the element 10.

Figure 3:
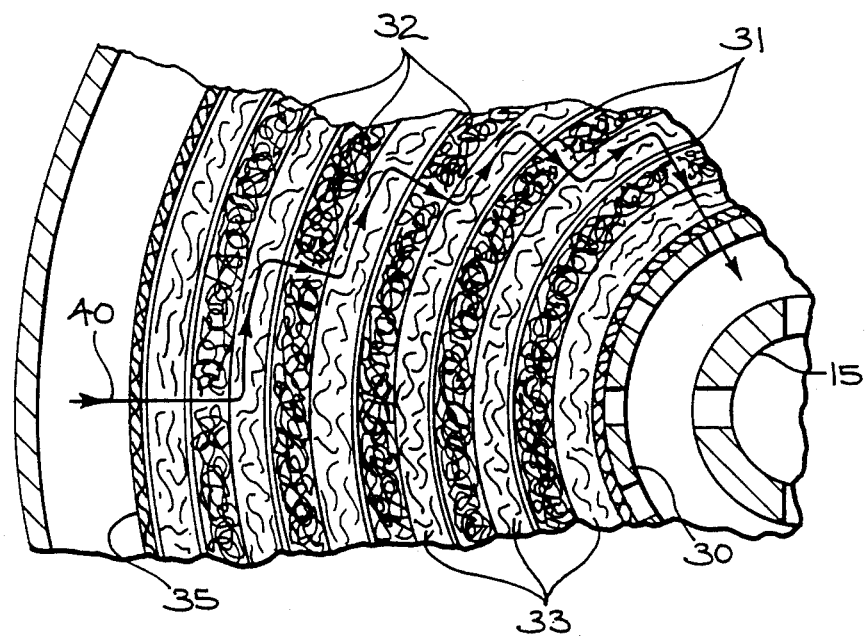
FIG. 3 is an enlarged view in transverse section illustrating a path of a fluid through the filter element of FIGS. 1 and 2.

When oil or other fluid to be filtered is forced into the casing through the inlet 12, it will tend to follow a radial path from the perimeter of the element 10 to the hollow central core 30 because that is the path of least resistance. In following a radial path, the fluid first encounters layers of the sock 35 and of the carrier sheet 31, both of which will exhibit some filtering action. However, the filtering effects of the sock and carrier sheet 31 are generally negligible in relation to the overall filtering capacity of the element 10. The fluid next encounters an outer layer of the coarse filter material 33 which will remove the larger particulate contaminants, and then the fluid encounters a layer of the fine filter material 32 where the fine particulate contaminants are removed. As a particular spot or area of filter material, either coarse or fine, becomes clogged or plugged with removed particles, the preferred radial path will be blocked and the fluid will be forced to travel circumferentially along the spiral layers to an available unclogged area where it can resume its radial flow path. A hypothetical flow pattern is illustrated by the arrows 40 in the enlarged cross-sectional view of FIG. 3. This alternating circumferential and radial movement of fluid through the filter element 10 allows all portions of the element to be effectively utilized. In contrast with filter elements using concentric layers of filter material, the plugging of a particular layer will not cause the filter to become inoperative because the fluid can take a circumferential, spiral course to another position and layer that is unplugged or unclogged.

The layer of fine filter material at each end of the element 10 prevents short circuiting of the fluid through a layer of coarse material that lies closer to the central core 30. That could occur if all of the lateral edges of the convoluted layers were exposed at the ends of the element 10.

Although the layer of fine filter material 32 terminates at the perimeter of the central core 30, most of the perimeter of the core 30 is surrounded by the layer of relatively coarse filter material 33. The relatively coarse filter material 33 acts as a pressure or flow release zone adjacent the core 30 to thereby allow fluid that has traversed through the filter element to that point to be relatively unimpeded as it flows through the openings in the core 30. A separate layer of highly porous material could be provided for the same purpose around the perimeter of the supporting core 30. The outer perimeter of the element 10 is encircled by the layer of relatively coarse filter material 33. That layer provides preliminary screening of large particles and also allows free flow of the fluid to all areas about the circumference of the element. Again, a separate layer of a highly porous material could be used for the same purpose to surround the perimeter of the element 10 instead of using continuation of the coarse material 33.

The tension applied to the carrier sheet 31 and to the blankets 32 and 33 of coarse and fine filter material as they are wound about the core 30 will determine the amount of compression of the filter material and will therefore determine the density of each layer. The tension can be selected to regulate the density of the more porous coarse filter material 33 so that it filters a major portion (i.e., 80% or more). This will allow the fine filter material to filter at a lower rate with little pressure drop across its layers. The end result will be a smaller pressure drop across the entire filter element. The spirally wound layers also will provide a lower pressure drop across the filter element than would a similar filter formed of two or more concentric layers because the fluid can always find a path of a lesser resistance, which may include a spiral circumferential path.

The successive convolute layers of fine and coarse filter material may be formed from other strati forms than simple blankets of porous filter material. For example, one or both of the strati of filter material can be formed by a pleated sheet. Such alternative approaches are shown in FIGS. 4 and 5.

Figure 4:
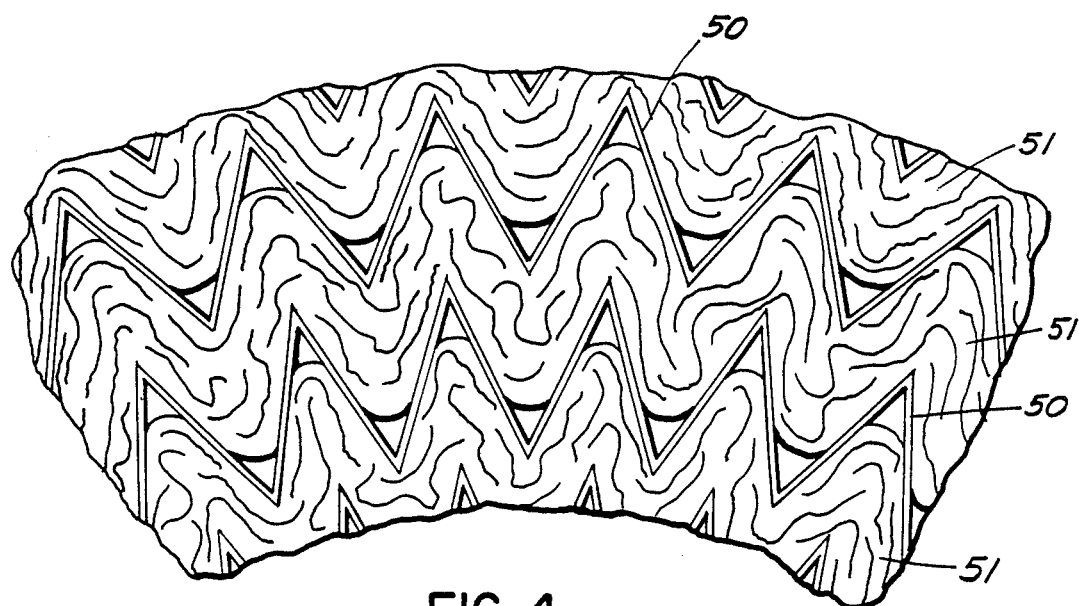
FIGS. 4 and 5 are enlarged views in transverse section illustrating alternative embodiments of the filter element.

In FIG. 4, the fine porous filter material is formed into a pleated sheet 50, while the coarse porous filter material 51 continues to be in the form of a blanket of wood excelsior or other non-woven materials. The pleated sheet 50 of fine media and the blanket 51 of coarser media will, as in the first embodiment of FIGS. 1–3, be laid one upon the other and spirally wound about the hollow supporting core 30. As shown in FIG. 4, the blanket 51 of coarser material will occupy the space between successive convolute layers of the fine media sheet 50 and will tend to nestle into the peaks and valleys defined by that sheet.

Figure 5:
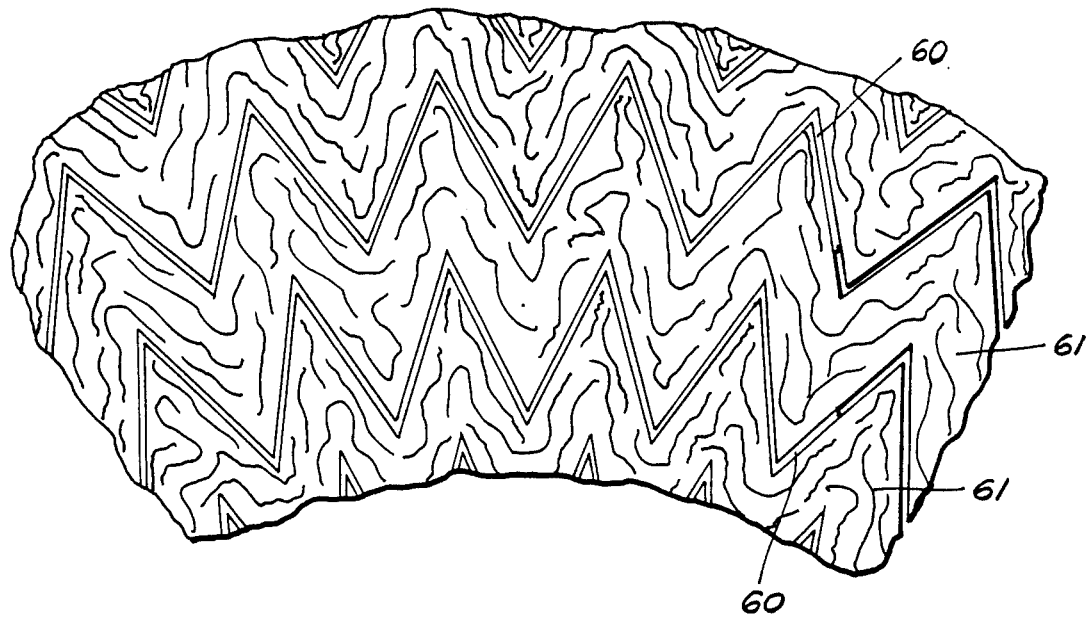

In FIG. 5, the alternating convolute layers of coarse and fine filtering material are provided by a pleated sheet 60 of fine material and a similarly pleated sheet 61 of coarser filter material. When both fine and coarse media are formed into pleated sheets, the sheets will nest one within the other as shown in FIG. 5.

In the alternative filter element constructions of FIG. 4 and 5, the flow paths will be the same as in that of the first embodiment. That is, the preferred flow path will be essentially radial. However, as areas of the layers of filter material become plugged or clogged, the fluid will assume a circumferential path along a spiral route until the fluid encounters an area that is unplugged or clogged. In both of the embodiments of FIGS. 4 and 5, the fine filter sheet 50 or 60 will extend beyond the lateral edges of the coarse filtering material to seal off the coarse material when the fine filter sheet is folded over at its edges.

In all embodiments, the strati of filter media can be formed of various materials. However, in all cases the filter media is a non-woven material. The media can consist of blankets, sheets or other strati of non-woven synthetic or natural fibers including paper. The porosity of the media can vary widely depending upon the desired end use. For filtering lubricating oils, the fine filter material may typically have a nominal rating of from 1 to 10 microns, while the coarse material may have a nominal rating of between 40 and 50 microns.

Although strati of only two different filter materials are shown in the preferred embodiments, more than two layers are also usable. Thus, for example, blankets or sheets of fine, medium and coarse filter media could be laid upon each other and spirally wound about the hollow supporting core 30. In all embodiments, both those illustrated and those described generally herein, the filter works best when it is provided with the longest possible flow path for fluid. The longer path can be provided by increasing the number of turns of material wound about the core 30.

We claim:

1. A fluid filter element, comprising:
   a hollow perforate cylindrical supporting core;
   a relative fine filtering media of substantially cross section spirally wound about the supporting core with adjacent layer spaced from each other and with the relatively fine filtering media exiting at the core, the fine filtering media accommodating fluid flow for filtering in both a radial and circumferential direction through the cross section and with free access through the cross-section to the core;
   a relatively coarser filtering material of substantial cross section disposed in the space between the layers of the fine filtering media and with the relatively coarser filtering material exiting at the core, the coarser filtering material accommodating fluid flow for filtering in both a radial and circumferential direction through the cross section and with free access through the cross-section to the core; and
   means closing the longitudinal ends of the coarser filtering material.

2. A filter element in accordance with claim 1 wherein the fine filtering media is in the form of a pleated sheet.

3. A filter element in accordance with claim 2 wherein the coarser filtering material is in the form of a blanket of filter material spirally wound next to the pleated sheet about the core.

4. A filter element in accordance with claim 2 wherein the coarser filtering material is in the form of a pleated sheet that nests with the fine media pleated sheet.

5. A filter element in accordance with claim 2 wherein the closing means comprises a substantial thickness of fine filtering media.

6. A filter element in accordance with claim 1 wherein the fine filtering media and the coarser filtering material are both provided by blankets of filter material laid one upon the other and spirally wound about said core.

7. A filter element in accordance with claim 6 wherein the closing means comprises a substantial thickness of fine filtering media.

8. A fluid filter element comprising:
   a hollow perforate cylindrical supporting core;
   at least two strati of porous filter material of substantial cross section spirally wound about the supporting core to form a plurality of successive convolute layers, one of said strati being of relatively fine porosity and the other of said strati being of relatively coarse porosity, both of said strati exiting at the core, both of said strati accommodating fluid flow for filtering in both a radial and circumferential direction through the respective cross sections and with free access through the respective cross-sections to the core; and
   means closing the longitudinal ends of the layers of coarser filter material,
   whereby fluid will initially pass radially through layers of both strati towards the core until a layer of filter material becomes clogged whereupon fluid will pass circumferentially through an adjacent layer until the fluid encounters an unclogged layer.

9. A filter element in accordance with claim 8 wherein the relatively coarse filter material is wood excelsior and the relatively fine filter material comprises cotton waste.

10. A filter element in accordance with claim 8 wherein said closing means comprises the stratum of relatively fine porosity.

11. A fluid filter element comprising:
    a hollow perforate cylindrical supporting core; and
    two blankets of porous filter material spirally wound about the supporting core to form a plurality of successive layers, one of said blanket being of relatively fine porosity and the other of said blankets being of relatively coarse porosity;
    both of said blankets having a substantial cross section and both accommodating fluid flow for filtering in both a radial and circumferential direction through the respective cross sections;

the blanket of relatively fine filter material extending beyond the longitudinal edges of the blanket of relatively coarse filter material to overlie the same to thereby close the longitudinal ends of the layers of relatively coarse filter material.

12. A filter element in accordance with claim 11 together with a thin carrier sheet of unwoven fiber spirally wound with the two blankets.

13. A fluid filter element, comprising:
a hollow perforate cylindrical supporting core;
a pleated sheet of relatively fine filtering media spirally wound about the supporting core with adjacent layers spaced from each other;
a relatively coarse porous filter material disposed in the space between the layers of fine filtering media; and
means closing the longitudinal ends of the coarse porous material.

14. A fluid filter in accordance with claim 13 wherein the coarse filter material is in the form of a pleated sheet of filter material.

15. A fluid filter element, comprising:
a hollow perforate cylindrical support core;
a blanket of relatively fine filtering media of substantial cross section spirally would about the support core with adjacent layers spaced from each other and with the blanket closing the longitudinal ends of the spaces between layers; and
a relatively coarse porous filter media of substantial cross section disposed in the space between the layers of fine filtering media;
both filter media accommodating fluid flow for filtering in both a radial and circumferential direction through the respective cross sections.

* * * * *